United States Patent [19]
Lebowitz et al.

[11] Patent Number: 6,075,451
[45] Date of Patent: Jun. 13, 2000

[54] RF CELLULAR TECHNOLOGY NETWORK TRANSMISSION SYSTEM FOR REMOTE MONITORING EQUIPMENT

[76] Inventors: Mayer M. Lebowitz, 6235 Lake Hubbard Pkwy., Dallas, Tex. 75229; James Sievert, 6235 Lake Hubbard Pkwy., Garland, Tex. 75043

[21] Appl. No.: 08/680,394

[22] Filed: Jul. 15, 1996

[51] Int. Cl.$^7$ .................................................. H04M 11/04
[52] U.S. Cl. ...................... 340/825.06; 455/404; 379/27; 340/541
[58] Field of Search .............................. 455/404; 379/27, 379/28, 29; 340/539, 825.06, 825.7, 541

[56] References Cited

U.S. PATENT DOCUMENTS

| | | | |
|---|---|---|---|
| 4,577,182 | 3/1986 | Millsap et al. | 455/404 |
| 4,635,040 | 1/1987 | Masot | 340/533 |
| 4,737,769 | 4/1988 | Masot | 340/533 |
| 4,993,059 | 2/1991 | Smith et al. | 455/404 |
| 5,131,019 | 7/1992 | Sheffer et al. | 455/404 |
| 5,146,486 | 9/1992 | Lebowitz | 455/404 |
| 5,272,465 | 12/1993 | Meares, Jr. | 455/404 |
| 5,400,246 | 3/1995 | Wilson et al. | 455/404 |
| 5,454,024 | 9/1995 | Lebowitz | 455/404 |
| 5,544,222 | 8/1996 | Robinson et al. | 455/404 |
| 5,594,740 | 1/1997 | LaDue | 455/404 |
| 5,608,171 | 3/1997 | Hunter et al. | 455/404 |
| 5,717,379 | 2/1998 | Peters | 340/539 |

*Primary Examiner*—David R. Hudspeth
*Assistant Examiner*—Daniel Abebe
*Attorney, Agent, or Firm*—Terry M Gernstein

[57] ABSTRACT

A system for transmitting data between a subscriber site and at least one monitoring station, comprising a sensor circuit for generating data responsive to an event at the subscriber site, a first transmission circuit responsive to said sensor circuit and being operable to transmit data in a first format from the subscriber site to the monitoring station over an RF telecommunications network, a second transmission circuit responsive to said sensor circuit and being operable to transmit data from the subscriber site to the monitoring station over a second telecommunications network. A programmable converter module converts between an alarm signal format and an RF cellular technology format.

22 Claims, 2 Drawing Sheets

RF CELLULAR TECHNOLOGY NETWORK TRANSMISSION SYSTEM FOR REMOTE MONITORING EQUIPMENT

TECHNICAL FIELD

The present invention relates to the general art of telecommunications, and to the particular field of over-the-air or cellular telecommunications especially for use with premises or other remote monitoring equipment.

BACKGROUND OF THE INVENTION

There are many situations in which remote monitoring of various conditions is desirable. For example, up-to-the minute status of high voltage feeder circuit breakers in electrical substations have been monitored in a remote manner, as well as other state conditions sensors, such as pressure, temperature, liquid level and the like, intrusion sensors are often monitored in a remote manner as are smoke detectors. Recently, medical information and even the location of a person have been monitored in a remote manner.

In the past, such remote monitoring equipment has used land line communication between the monitoring equipment and the monitoring station. However, such land line communication links can be subject to several drawbacks. For example, in severe weather conditions or in wet climates, the land lines may be damaged by weather conditions or water. Such damage may degrade the link to such an extent that data transmitted over such link, if transmission is not totally interrupted, may become unreliable. Furthermore, land line communications may be subject to being deliberately interrupted by an intruder.

To overcome such problems, there have been several proposals in the art for including a radio link as a backup to a land line link. Such systems use the land line link if it is available, and switch to the radio link if the land line link is not operative.

While somewhat successful in avoiding the problems associated with a link consisting only of a land line, such land line/radio link systems still have certain drawbacks. For example, a radio link may not permit a system integrity check and there may not be a good method of determining the integrity of the link and ensuring that the monitoring station is on line with the subscriber premises station at all times. If, for example, the antenna at the subscriber station has been damaged, the link may not be properly established, and radio links may not be able to monitor such condition. Many radio link repeater site stations may be open and accessible to many people and thus may be subject to tampering.

Still another problem with using radio links is that several repeater stations may be required in addition to a base station to cover a prescribed area. Additionally, the radio transmitters at the subscriber premises may be restricted to low power outputs and may be able to communicate only within a certain geographic area and report to only one receiver site having no redundancy. Furthermore, if a repeater station fails, incoming signals may be lost.

Still further, radio transmitters may be restricted in the number of radio channels that can be used in a particular geographic area. This may require subscribers to share channels, and create a potentially undesirable situation. Furthermore, if two or more radio transmitters key at the same time, it may be possible that no communication is received at the monitoring station. System overload is also possible with such systems.

Yet a further problem with radio links is the limited adaptability thereof. For example, radio links may not be amenable to use with premises monitoring equipment that includes the transmission of slow scan, freeze frame, or real time CCTV, or to use with supervisory monitoring equipment that might include computer controlled fault-monitoring equipment. More importantly, such systems may not be completely usable with a system that includes downloading of information from the monitoring station to the subscriber station. That is, it may not be possible to efficiently send all of the information and data signals that are necessary for efficiently monitoring a premises from the monitoring station to the subscriber station over such links.

Yet a further problem with such systems is inherent in the switching system itself. That is, as mentioned above, these systems attempt to communicate with the monitoring station via a land line, and if such land line is inoperative, will switch to a radio link. This requirement may make the integrity of the system dependent on the switching system. Should this system become damaged or inoperative, the entire system will become inoperative. It can even be possible to view the overall integrity of the overall system as being a function of the integrity of the switching system. The switching operation may, in some cases, interrupt the data signal and introduce a spike into the signal, and therefore, influence the content and reliability of such signal. In some circumstances, the data can be of such a character that the switching operation may affect such data.

Therefore, systems that use only a land line link between a subscriber station and a monitoring station have problems, and those systems that include a radio link backup and switch to that radio link if the land line link is inoperative also have several restrictions and drawbacks.

BRIEF SUMMARY OF THE INVENTION

It is a primary object of the present invention to provide a RF network premises monitoring system capable of functioning with a wide variety of cellular structured Circuit Switched Packet Data CSPD technologies such as ARDIS, CELEMATRY, RAM Data and CDPD. However, for presentation purposes, we have chosen to describe the CDPD technology as the RF network of choice since this technology is covered in U.S. Pat. No. 5,454,024.

In a preferred embodiment the present invention includes a converter module for converting between alarm format signals and CDPD technology signals. The converter module is first located between the alarm signal panel and the CDPD transmission circuitry to convert alarm signal formats into a CDPD technology format. The converted signal is then transmitted over a CDPD network to a RF transceiver at the central monitoring station. The received signal is passed through another converter module to translate the signal from the incoming CDPD technology format back to the original transmitted alarm signal format. The converter module then transmits a signal corresponding to the receiver's manufacturers instructions, forcing the monitoring station's alarm receiver to go into an off-hook condition and receive the converted message.

Conversion of signals may be accomplished between a variety of alarm signal formats such as FOUR-TWO Extended and CDPD or any other and RF CSPD. This is possible because the conversion of the alarm format signal to a pre-selected CDPD technology is carried out by a processor module within the converter module in response to a selected software package. The processor module with its converter may be an integral built-in part of the alarm control panel, or separate device external to it. A multitude of different RF software programs reside within the converter. In order to change between RF formats, such as RAM Data and CDPD, all that is required is turning on the correct software package in the converter.

The foregoing has outlined some of the more pertinent aspects of the present invention. These aspects should be construed to be merely illustrative of some of the more prominent features and applications of the invention. Many other beneficial results can be attained by applying the disclosed invention in a different manner or modifying the invention as will be described. Accordingly, other aspects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
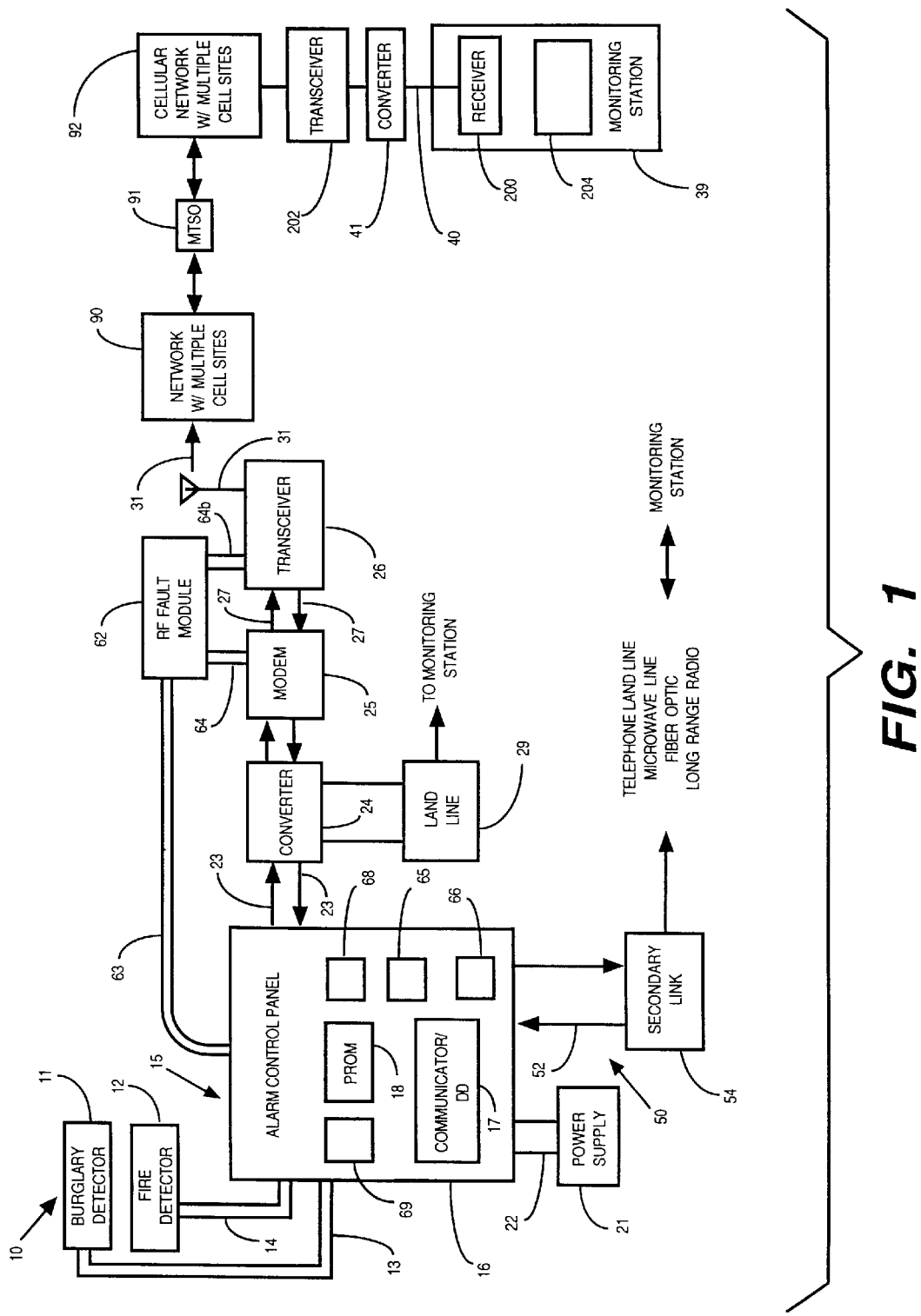
FIG. 1 illustrates by way of background an overall premises-monitoring using a RF link as the primary communications link between a subscriber station and a monitoring station with a second telecommunications network as a backup communications link.

As used herein, RF Cellular Technology refers to systems such as CDPD, ARDIS, RAM DATA and the industry standards associated therewith. The following description of the Figures is intended to be a generic description of various RF Cellular technologies but is generally describing CDPD cellular technology. As shown in FIG. 1, in a known system sensor circuitry 10 located on a subscriber's premises can include a plurality of sensors, such as burglar detection devices 11, a fire detection device 12, or the like located at various positions on the premises. As discussed in U.S. Pat. No. 4,825,457, for example, the disclosure of which is incorporated herein by reference, these sensors generate an electrical signal in response to the detected event, and such signals are conducted via conductors, such as conductors 13 and 14, to first transmission circuitry 15 which includes a digital communicator 17.

Alarm control panel 16 includes communicator/digital dialer 17 and a programmable memory means such as a PROM 18. The PROM 18 is programmed with specific data such as the identification number of the site, account number, the emergency code (for fire, burglary, medical or the like), and the telephone number(s) of any alarm monitoring station(s) to be called as will be explained hereinafter. The PROM 18 can be removed and replaced as necessary and is connected to a suitable source of electrical power such as power supply 21 connected to the digital communicator/digital dialer via conductors, such as conductor 22. The PROM can be programmed to generate alarm signals in a variety of formats, such as four-two, in response to the generated electrical signals.

The output of the alarm control panel 16 and communicator 17 is connected by means of conductors 23 to a converter 24 which converts the alarm format signal into an RF Cellular technology format and passes the signal to modem 25 or primary link 27. The converter 24 will be more fully discussed with respect to FIG. 2. The modem 25 then electronically enters the "dial" signals into the transceiver 26 by means of conductors, such as conductor 27. The modem thus provides a path of communication between the communicator/digital dialer 17 and the RF transceiver 26.

The RF network 90 includes a plurality of cell sites, and a cell site may comprise a computer and an antenna by means of which transmissions emanating from the transceiver antenna 31 are received. The cell site is connected by telephone land lines, microwave link, or like means to the MTSO 91. MTSO is connected via a suitable link to another RF network 92 which is connected to the monitoring station 39 through a converter 41.

Figure 2:
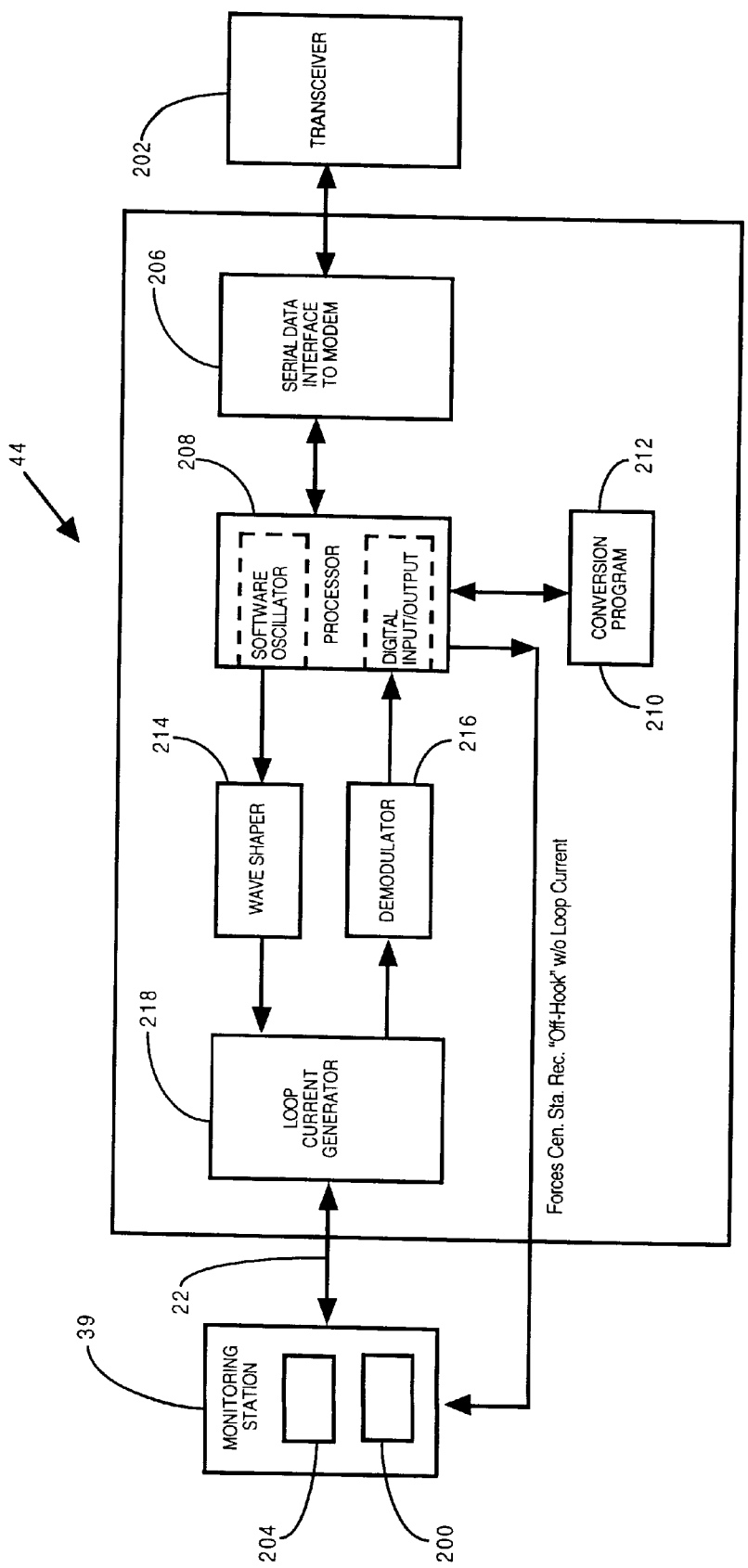
FIG. 2 is a block diagram of the converter for translating signals between alarm signal format and RF cellular technology format.

FIG. 2 is a block diagram illustrating the converter 24,41. The description of FIG. 2 will be with respect to converter 41. However, it should be realized that the description is equally applicable to converter 24. The converter 41 at the central monitoring station 39 may be internal or external to the monitoring station receiver 200. The converter 41 receives RF Cellular Technology Format messages that must be translated back into the alarm signal format originally transmitted from the alarm control panel 16. These alarm signal formats may then be recognized by the central monitoring station computer 204. The messages received through the RF network 92 or, over the secondary link 54 provided they too are in a RF data cellular technology format, are received at the RF transceiver 202. A secondary link using ordinary telephone land lines or voice circuit switched cellular would be received directly into the central station receiver 200 in the monitoring station. In a preferred embodiment the RF transceiver 202 comprises a Hayes modem type device. The received signal is interfaced with the converter 41 through a serial data interface 206. A processor 208 programmed according to a conversion program 210 stored within a memory storage area 212 processes the RF Cellular Technology Format signal in conjunction with a wave shaper 214 and demodulator 216 to generate the alarm format signal originally transmitted from the alarm control panel. Converted signals are temporarily stored in memory storage area 212 until the central monitoring station receiver 200 is ready to accept the signal.

The converter 41 may actuate a connection with the central monitoring station receiver 200 in two different manners. A loop current generator 218 may signal the receiver 200 to initiate an off-hook condition at the central monitoring station 39. During the off-hook condition, the translated alarm signal format is transmitted to the central monitoring station receiver 200 via a transmission line 40 from the memory storage area 212. The processor 208 may also generate a signal to provide a momentary "dry" closure to the central monitoring station receiver 200 and force the receiver into the off-hook condition. This is normally accomplished by providing a momentary short across incoming telephone lines to the receiver 200.

The present invention is useful with respect to the translation of a variety of RF Cellular Technology Formats such as CDPD, RAM DATA and ARDIS. Each of these formats may be processed by the same converter described above by merely utilizing a different conversion program 210 for controlling the processor 208. The use of varying conversion programs 210 also enables the processing of various alarm signal formats.

The converter 41 is either wired into a dedicated telephone line card connected to the central station receiver 200 or directly connected to terminals on the central station receiver. Existing brands of receivers having terminal connections on their interface panels include the SUR-GARD MLR2-DG, FBI CP200 and the Osborne-Hoffman QUICKALERT. These receivers may be forced to go off-hook and receive an incoming signal in response to a dry-closure signal from the processor 208. Other types of receivers that must be wired into a dedicated telephone line card include the ADEMCO 685 and the SILENT KNIGHT 9000.

The communications link between the monitored premises and the monitoring station via the MTSO 91 is the primary communications link, and once a signal from one of the sensors is generated, such signal is transmitted to the alarm control panel 16. A control signal is provided to the communicator/digital dialer 17 from the cellular interface, and the communicator/digital dialer then transmits the telephone number of the monitoring station 39 to the transceiver 26 via the modem which sends this information over the RF networks to the monitoring station 39.

RF network cell sites within the networks 90 and 92 may, via antennas, re-transmit the signals they receive from the subscriber's RF transceiver 26 to other locations or other monitoring stations. Of course, the central monitoring station 39 may be located in network 90.

The system of FIG. 1 also utilizes a secondary communication link as a back up to the above-described RF communication link as well as fault monitoring equipment and switching equipment to determine the integrity of both links and to switch to the most reliable link. This back up system is shown in FIG. 1A as including the link 50 connected at one end to the subscriber digital communicator by conductors, such as conductor 52 and at the other end to the alarm monitoring station via a link 54. An RF fault module 62 is connected to the digital communicator 16 by conductors, such as conductor 63 and to either the modem or the RF transceiver (or both) by conductors, such as conductors 64a and 64b, and continuously monitors the integrity of the RF interface and cell site(s) that the transceiver can communicate with. The system also includes selection circuitry 65 and switching circuitry 66 connected to the fault module as well as second transmission circuitry 68 that is adapted to transmit data over the secondary network. Selection circuit 69 can also be included to select one of a plurality of monitoring stations in sequence as the destination for the transmissions of data and for prompting the transmission circuitry to transmit data to each of the plurality of monitoring stations.

In the event the RF communications link is not operative, the switching circuitry is activated and data is sent via the link 50, which may be a telephone landline, microwave line, fiber optic network or long range radio transceiver.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

We claim:

1. An apparatus for monitoring RF cellular format data received from a cellular network, comprising:
    first means for interfacing the apparatus to the cellular network;
    means for translating the RF cellular format data from the cellular network into alarm format data, said means for translating programmable to translate to and from a format selected from the group consisting of ARDIS, RAM DATA and CELEMATRY and a plurality of RF cellular formats; and
    second means for interfacing the apparatus to a monitoring station receiver.
2. The apparatus of claim 1 wherein the means for interfacing comprises a transceiver.
3. The apparatus of claim 1 wherein the means for interfacing comprises a modem.
4. The apparatus of claim 1 wherein the means for translating comprises a microprocessor responsive to a controlling program.
5. The apparatus of claim 1 further including means for storing translated data until transmission to the monitoring station receiver.
6. The interface defined in claim 5 further including a daughter board connected to said motherboard for transferring a signal from a data bus to said motherboard.
7. The apparatus of claim 1 further including means for initiating contact with the monitoring station receiver in response to translation of data.
8. The apparatus of claim 1 wherein the means for translating comprises a microprocessor responsive to a controlling program.
9. The interface defined in claim 1 further including means for connecting to a line output of an alarm system control panel.
10. The interface defined in claim 1 further including means for connecting to a data bus of an alarm system control panel.
11. The interface defined in claim 1 including a motherboard connected to the event reporting devices and a plurality of daughter boards each connected to the motherboard and each associated with one of the data packet technologies whereby signals from any of the alarm reporting devices are transmitted via a selected daughter board in a data packet technology associated with the selected daughter board.
12. The interface defined in claim 1 wherein the alarm signals include voice packets.
13. The interface defined in claim 1 wherein the alarm signals include freeze frame television.
14. The interface defined in claim 1 wherein the alarm signals include slow scan television.
15. An apparatus for use with an alarm monitoring system at a subscriber location:
    first means for interfacing the apparatus to the alarm monitoring system;
    means for translating alarm format data received by the alarm monitoring system into cellular RF format data, said means for translating programmable to translate to and from a a format selected from the group consisting of ARDIS, RAM DATA and CELEMATRY and cellular RF in a plurality of data formats; and
    second means for interfacing the apparatus to a cellular network.
16. The apparatus of claim 15 wherein the second means for interfacing comprises a transceiver.
17. The apparatus of claim 15 wherein the means for interfacing comprises a modem.
18. An apparatus for use with an alarm monitoring system, comprising:
    a processing means responsive to received data for translating between an alarm data format selected from the group consisting of ARDIS, RAM DATA and CELEMATRY and a plurality of cellular RF data formats, said processing means programmable to translate a plurality of alarm formats and cellular RF formats; and means for interfacing the processing means to the alarm monitoring system.

19. A system for use with a subscriber premises monitoring system comprising:

means for receiving alarm signals from a premises monitoring system;

means responsive to said alarm signals for translating alarm signals into an output signal selected from the group consisting essentially of ARDIS, RAM DATA and CELEMATRY; and means responsive to said output signal for transferring said output signal to an alarm monitoring station receiver.

20. An apparatus for transmitting information from an Event Reporting Device (ERD) in an RF cellular format over an RF cellular network comprising:

first means for interfacing the apparatus to an ERD and a cellular network;

second means for receiving and translating RF cellular format data from the cellular network into original ERD format data, said means for translating being programmable to translate to and from a format selected from the group consisting of voice, data and overhead control channels of AMPS/Analog ARDIS, RAM Data and a plurality of RF cellular formats; and third means for interfacing said first and second means to a monitoring receiver.

21. For use in a telecommunications network: a universal interface for receiving alarm signals from any of a plurality of different Event Reporting Devices and communicating said received signals to a remote location via a data package technology selected from the group of networks consisting of CDPD, CDMA, GSM, TDMA and Satellite Direct.

22. The universal interface defined in claim 21 including means for supporting at least two separate and different RF technologies simultaneously and means for constantly monitoring for and reporting a loss of integrity of RF technology.

* * * * *